United States Patent [19]
Birmingham

[11] Patent Number: 6,004,385
[45] Date of Patent: Dec. 21, 1999

[54] COMPACT GAS LIQUID SEPARATION SYSTEM WITH REAL-TIME PERFORMANCE MONITORING

[75] Inventor: Daniel P. Birmingham, Houston, Tex.

[73] Assignee: Hudson Products Corporation, Houston, Tex.

[21] Appl. No.: 09/072,037

[22] Filed: May 4, 1998

[51] Int. Cl.⁶ .................................................. B01D 19/00
[52] U.S. Cl. .............................. 96/174; 96/208; 96/209; 96/216; 96/421
[58] Field of Search ............................. 96/156–172, 174, 96/207–212, 216, 417, 421

[56] References Cited

U.S. PATENT DOCUMENTS

| | | | |
|---|---|---|---|
| 791,517 | 6/1905 | Walker . | |
| 2,004,468 | 6/1935 | Hawley . | |
| 2,037,426 | 4/1936 | McKeever . | |
| 2,256,524 | 9/1941 | McKelvey . | |
| 2,284,513 | 5/1942 | Coward . | |
| 2,533,977 | 12/1950 | Van Dornick . | |
| 2,792,075 | 5/1957 | McBride et al. . | |
| 2,862,479 | 12/1958 | Blaser et al. ............................... | 122/34 |
| 2,923,377 | 2/1960 | Schluderberg . | |
| 3,324,634 | 6/1967 | Brahler et al. ............................. | 55/337 |
| 3,345,046 | 10/1967 | Versluys et al. .......................... | 261/79 |
| 3,360,908 | 1/1968 | Baily ......................................... | 55/347 |
| 3,488,927 | 1/1970 | Jepsen et al. .............................. | 55/237 |
| 3,641,745 | 2/1972 | Moore ........................................ | 55/345 |

(List continued on next page.)

FOREIGN PATENT DOCUMENTS

| | | |
|---|---|---|
| 0 048 508 | 3/1985 | European Pat. Off. . |
| 0 195 464 | 4/1989 | European Pat. Off. . |
| 2 051 181 | 10/1970 | Germany . |
| 109 804 | 11/1974 | Germany . |
| 420 061 | 3/1967 | Switzerland . |
| 1123546 | 8/1968 | United Kingdom . |
| 2 124 929A | 2/1984 | United Kingdom . |
| 02203062 | 10/1988 | United Kingdom . |

OTHER PUBLICATIONS

Prueter, Reed & Schneider, "Extended Steam/Water Testing of the Babcock & Wilcox Separation Equipment", B&W Technical Paper presented at the Second International Steam Generator & Heat Exchanger Conference, Toronto, Canada, Jun. 13–15, 1994. Entire paper.

Giset & Woulfe, "The Three Stroke Separation and Transportation System", (Offshore Technology Conference [OTC] Paper #7039, Copyright 1992, Offshore Technology Conference. Paper presented at the 24th Annual OTC in Houston, Texas, May 4–7, 1992. pp. 503–508.

Brekke, "The Aker Three Stroke Separation—Transportation System", 1991 ICHEME–Subsea Separation and Transport III Conference in London, United Kingdom. Entire paper.

Edwards, W.G., "Boet Subsea Separation Development", 1991 ICHEME–Subsea Separation and Transport III Conference in London, United Kingdom. Entire paper.

Songhurst & Edwards, "Subsea Separation: An Economic Method for Submarginal Fields," OTC Paper #5922, Copyright 1989, Offshore Technology Conference. Paper presented at the 21th Annual OTC in Houston, Texas, May 1–4, 1989, pp. 405–416.

Baker & Entress, "The VASPS Subsea Separation and Pumping System", *Trans IChemE,* vol. 70, Part A. Jan. 1992, pp. 9–16.

(List continued on next page.)

*Primary Examiner*—Robert Spitzer
*Attorney, Agent, or Firm*—R. J. Edwards; Eric Marich

[57] ABSTRACT

A gas/oil separation system for monitoring the performance of a compact, gas/oil separator apparatus which utilizes at least one pair of centrifugal force primary and secondary separators for separating a wellhead fluid containing crude oil, produced water, and hydrocarbon gas from a hydrocarbon production system into its gas and liquid parts employs relatively simple differential pressure instrumentation for producing real-time signals representative of the compact, gas/oil separator apparatus' liquid carryover performance.

8 Claims, 10 Drawing Sheets

U.S. PATENT DOCUMENTS

| | | | |
|---|---|---|---|
| 3,654,748 | 4/1972 | Bloom | 55/322 |
| 3,710,556 | 1/1973 | Barratt et al. | 55/210 |
| 3,788,282 | 1/1974 | Modrak et al | 122/34 |
| 3,796,026 | 3/1974 | Mugford | 55/338 |
| 3,961,923 | 6/1976 | Rouhani | 55/457 |
| 4,015,960 | 4/1977 | Nutter | 55/355 |
| 4,077,362 | 3/1978 | Hawkins | 122/491 |
| 4,238,210 | 12/1980 | Ragehr et al. | 55/396 |
| 4,289,514 | 9/1981 | Carter et al. | 55/398 |
| 4,349,360 | 9/1982 | Schuurmans et al. | 55/238 |
| 4,358,301 | 11/1982 | Chaix et al. | 55/318 |
| 4,648,890 | 3/1987 | Kidwell et al. | 57/347 |
| 4,982,794 | 1/1991 | Houot | 166/357 |
| 5,033,915 | 7/1991 | Albrecht | 406/173 |
| 5,209,765 | 5/1993 | Kolpak et al. | 55/168 |
| 5,807,427 | 9/1998 | Welch | 96/210 |

OTHER PUBLICATIONS

Entress, Baker Jardine & Assocs.; Pridden, Mentor Engineering Consultants; and Baker, Baker Jardine & Assocs., "The Current State of Development of the VASPS Subsea Separation and Pumping System", OTC Paper #6768, Copyright 1991, Offshore Technology Conference. Presented at 23rd Annual OTC in Houston, Texas, May 6–9, 1991, pp. 627–635.

Lovie, Bardex Subsea Corp.; Baugus, Oryx Energy Co.; Grecco, Unocal Corp.; and Schutter, Chevron Research & Technology Co., "Subsea Processing System Ready for Gulf of Mexico Field Conditions". OTC Paper #7245, Copyright 1993, Offshore Technology Conference. Presented at the 25th Annual OTC in Houston, Texas, May 3–6, 1993, pp. 393–404.

Sarshar, "Subsea Separation: Technology, Equipment Available Now", 1991 ICHEME–Subsea Separation and Transport III Conference in London, United Kingdom. Entire paper.

Queseth, Yardley & Stinessen, "A Feasible Way to Perform Subsea Separation and Gas Compression", PD–Vol. 46, Pipeline Engineering '92, ASME 1992, pp. 51–61.

Queth & Stinessen, "Kværner Booster Station Development Project—Phase 2", ICHEME—Subsea Separation and Transport III Conference in London, United Kingdom. Entire paper.

Beran, Brown & Root Seaflo; Hatton, Texaco, Inc.; Stires, BHP Petroleum (Americas) Inc.; and Gunderson, Exxon Production Research, "Subsea Pressure Boost/Separation—A Necessity for Deepwater Development?". OTC Paper #7267. Presented at the 25th Annual OTC in Houston, Texas, May 3–6, 1993. Entire paper.

Shoup, Amoco Production Co. & Shoham, U. of Tulsa, "Pipeline Design for Deepwater Gulf of Mexico Developments". OTC Paper #6411, Copyright 1990, Offshore Technology Conference. Paper presented at the 22nd Annual OTC in Houston, Texas, May 7–10, 1990, pp. 609–621.

Stinessen, Gustafson (Kvaerner Energy, Oslo, Norway) & Lunde (SINTEF, Trondheim, Norway), "Test Results from the Integration Testing of the Kvaerner Booster Station at the SINTEF Multiphase Flow Laboratory". Presented at the 6th International Conference on Multiphase Production, BHR Group Conference Series, Pub. 4, Cannes, France, Jun. 1993, pp. 415–436.

Coker, A.K.C. Technology, Sutton Coldfield, U.K., "Computer program enhances guidelines for gas–liquid separator designs", *Oil and Gas Journal*, May 10, 1993, pp. 55–62.

Birmingham, D.P. & Davies, S.R. SPE 30401—"Evaluation of Compact Steam/Water Separation Equipment for Gas/Oil Systems". ©1995, Society of Petroleum Engineers, Inc. Presented at the Offshore Europe Conference in Aberdeen, Scotland, Sep. 5–8, 1995, pp. 351–368.

Hart's euroil, The European Magazine of International Oil and Gas, Volume 6, Issue 9, Sep. 1995, pp. Cover, 15 and 16.

COMPACT GAS LIQUID SEPARATION SYSTEM WITH REAL-TIME PERFORMANCE MONITORING

FIELD OF THE INVENTION

The present invention relates generally to gas/oil separation systems having single or multiple pairs of centrifugal force separators for separating oil and gas phases contained in wellhead fluids obtained from hydrocarbon production systems, either topside or in subsea locations. In particular, the present invention relates to a gas/oil separation system which utilizes a compact, gas/oil separator apparatus having at least one pair of centrifugal force primary and secondary separators and which, when fitted with relatively simple pressure instrumentation, can produce real-time signals that are representative of the compact, gas/oil separation system's liquid carryover performance—a system having a real-time monitoring capability.

BACKGROUND OF THE INVENTION

Conventional oil and gas separators typically use large vessels that rely on natural or gravity separation to achieve the desired separation performance. The performance of the separator vessel is generally monitored by observing the downstream processes. Various sampling systems can also be used to monitor the separator's performance, and require special hardware to be installed in the outlet gas piping.

An improved apparatus for separating an oil/liquid phase from a gas phase contained in a wellhead fluid from a hydrocarbon production system is disclosed in the U.S. application Ser. No. 08/695,947 filed Aug. 13, 1996 titled COMPACT, HIGH-EFFICIENCY, GAS/LIQUID SEPARATOR METHOD AND APPARATUS, which is a continuation of U.S. application Ser. No. 08/337,359 filed Nov. 10, 1994, now abandoned, both of which are herein incorporated by reference in their entirety. Unless otherwise stated, definitions of terms in Ser. No. 08/695,947 are valid for this disclosure also. Field testing of that compact, gas/oil separation apparatus has demonstrated that it is quite efficient at separating a wellhead fluid mixture containing crude oil, produced water, and hydrocarbon gas from a hydrocarbon production system into its gas and liquid parts. The compact, gas/oil separator preferably utilizes one or more curved-arm, centrifugal force, primary separator(s) and one or more cyclone, centrifugal force, secondary separator(s), always employed in pairs. The compact, gas/oil separator apparatus can be used in multiple pairs (two or more primary and two or more secondary separators) or in a single pair configuration having only a single primary and a single secondary separator.

The trend in the hydrocarbon production industry is to utilize equipment that is more compact than the traditional separation equipment, and the above-identified compact, gas/oil separator apparatus fits these requirements. The compactness has the obvious advantages of smaller size and less weight, that translates into real cost savings when applied to an offshore platform. However, an inherent disadvantage of compact separation equipment due to its smaller size is its reduced capability to handle upsets in the system. Without a means for continuous monitoring of performance, there is the risk of a poor performing separator affecting downstream processes.

SUMMARY OF THE INVENTION

The present invention relates to a gas/oil separation system which utilizes a compact, gas/oil separator apparatus having at least one pair of centrifugal force primary and secondary separators and which, when fitted with relatively simple pressure instrumentation, can produce real-time signals that are representative of the compact, gas/oil separation system's liquid carryover performance—a system having a real-time monitoring capability.

It has been demonstrated that the aforementioned compact, gas/oil separator apparatus is well suited for separating a wellhead fluid mixture (wellhead fluid) containing crude oil, produced water, and hydrocarbon gas from a hydrocarbon production system into its gas and liquid parts. As described, the compact, gas/oil separator apparatus preferably utilizes one or more curved-arm, centrifugal force, primary separator(s) and one or more cyclone, centrifugal force, secondary separator(s). The primary and secondary centrifugal force separators are always employed in pairs. In a preferred embodiment of the gas/oil separator apparatus, a single pair—one primary and one secondary—is used.

An important aspect of the present invention involves the production of real-time signals that are representative of the liquid carryover performance of the compact, gas/oil separator apparatus. Such real-time signals can be used by a human operator to monitor the performance of the compact, gas/oil separator apparatus as installed into the hydrocarbon production system and, if necessary, periodically make adjustments to optimize the performance of the separator and/or to maximize the hydrocarbon production based upon the actual capability of the separator. More importantly, these real-time signals can be input to a feedback control system to automatically alert an operator of a certain condition, and/or to automatically take remedial or corrective action(s) to immediately improve the condition. The result is a higher level of assurance to the operator that the compact, gas/oil separator apparatus is producing an output stream of acceptable quality. In accordance with the present invention, a simple arrangement of particularly placed pressure transducer elements are provided on the compact, gas/oil separator apparatus to produce two (2) differential pressure measurements on the second stage of separation performed by the cyclone, centrifugal force, secondary separator. The first differential pressure measurement represents the pressure drop across an inlet region of the secondary separator, including its skimmer slots. The present inventor has discovered that this measurement is quite sensitive to the amount of liquids entering the secondary separator. The second differential pressure measurement represents the overall pressure drop across the overall secondary separator. This measurement responds to gas flow entering the secondary separator but it is much less dependent on any amount of remaining oil/liquid droplets that typically enter the secondary separator.

Accordingly, one aspect of the present invention is drawn to a gas/oil separation system for monitoring and controlling the performance of a compact, gas/oil separator apparatus which utilizes at least one pair of centrifugal force primary and secondary separators for separating a wellhead fluid containing crude oil, produced water, and hydrocarbon gas from a hydrocarbon production system into its gas and liquid parts by producing real-time signals representative of the compact, gas/oil separator apparatus' liquid carryover performance. The system can either merely display, alarm, and/or store the real-time signals representative of the carryover performance, or it can perform a control function. The system comprises: a vessel having a wellhead fluid inlet for entry of a wellhead fluid, a gas export outlet for exit of export gas separated from the wellhead fluid, and an oil/liquid export outlet for exit of oil/liquid separated from the wellhead fluid. A primary centrifugal separator is provided in the vessel for separating a majority of the oil/liquid phase from the wellhead fluid to leave a wet gas phase. In addition, a secondary centrifugal separator having an inlet region with a plurality of tangential inlet vanes into which the wet gas phase passes is also provided, spaced above and axially aligned with the primary centrifugal separator by an open interstage region, for receiving the wet gas phase and further separating oil/liquid from the wet gas phase to leave a dry gas phase. The secondary centrifugal separator includes skimmer means defining skimmer slots above the inlet vanes for receiving the dry gas phase and for channeling the further separated oil/liquid downwardly into the vessel, the skimmer means having an open upper end communicating with the gas export outlet for passing the dry gas phase to the gas export outlet. Means are provided for producing a first differential pressure measurement $\Delta P_1$ across the inlet region of the secondary cyclone centrifugal separator. Means are also provided for producing a second differential pressure measurement $\Delta P_2$ across the overall secondary cyclone centrifugal separator. Finally, controller means are provided for processing the first and second differential pressure measurements $\Delta P_1$ and $\Delta P_2$ for viewing by an operator.

In another aspect of the invention, means are provided for processing the $\Delta P_1$ and $\Delta P_2$ differential pressure measurements to produce a signal representative of a ratio of the overall secondary cyclone pressure drop $\Delta P_2$ to the inlet region pressure drop $\Delta P_1$ equal to $(\Delta P_2/\Delta P_1)$ for viewing by an operator. It has been discovered that when this ratio is in a range of approximately 10 or greater, the compact, gas/oil separator apparatus has acceptable minimum liquid carryover characteristics.

Another aspect of the present invention involves the provision of controller means for producing control signals based upon the first and second differential pressure measurements $\Delta P_1$ and $\Delta P_2$ which are used to control at least one of a liquid level control valve, a chemical defoamer injection pump, and a wellhead fluid choke valve associated with the system. The controller means comprises means for inputting user-defined setpoints for at least one of liquid level, chemical defoamer injection rate, and wellhead fluid flow rate.

In another important aspect of the invention, the controller means continuously collects data corresponding to the first and second differential pressure measurements $\Delta P_1$ and $\Delta P_2$ and calculates magnitudes and signal to noise ratio (SNR) values of new first and second differential pressure measurements $\Delta P_1$ and $\Delta P_2$, compares same with calculated magnitudes and SNR values of previously collected first and second differential pressure measurements $\Delta P_1$ and $\Delta P_2$. The controller means then produces control signals for at least one of the liquid level control valve, the chemical defoamer injection pump, and the wellhead fluid choke valve based upon the comparison and changes in said magnitude and SNR values. Particular changes in the data collected, such as when a magnitude of the differential pressure signal $\Delta P_1$ suddenly increases, and its signal to noise ratio (SNR) decreases by a significant amount, and the SNR of the differential pressure signal $\Delta P_2$ decreases by a significant amount, will trigger control action to be taken by the controller means. The various types of control action include at least one of decreasing the liquid level setpoint to a minimum liquid level set point, increasing the injection rate of defoamer chemical, choking back on wellhead flow to the gas/oil separator apparatus, and shutting off wellhead flow to the gas/oil separator apparatus.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which preferred embodiments of the invention are illustrated.

DESCRIPTION OF THE PREFERRED EMBODIMENTS

Since the present invention is drawn to a gas/oil separation system for monitoring and/or controlling the performance of a compact, gas/oil separator apparatus, a brief description of the compact, gas/oil separator apparatus is set forth below.

Figure 1:
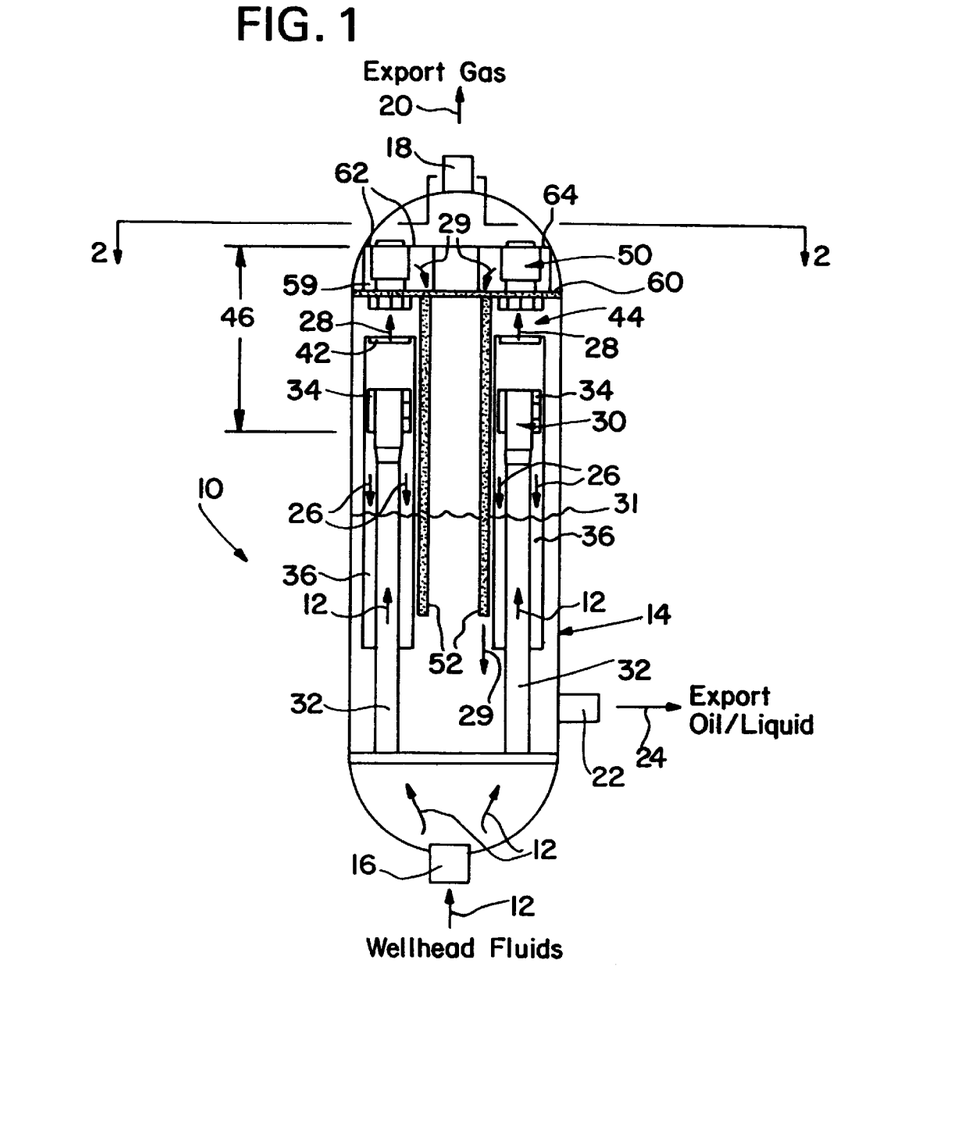
FIG. 1 is a schematic sectional view illustrating a compact gas/oil separator apparatus utilizing plural primary and plural secondary centrifugal separators.
Figure 2:
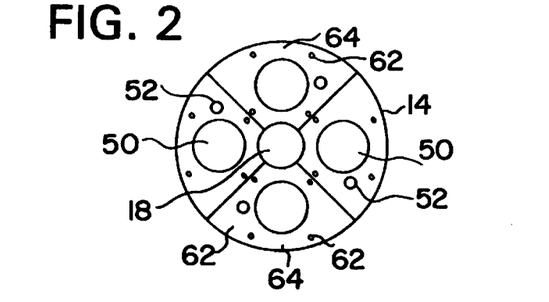
FIG. 2 is a cross-sectional view taken in the direction of arrows 2—2 of FIG. 1.

Referring to the drawings generally, wherein like numerals designate the same or functionally similar elements throughout the several drawings, and to FIG. 1 in particular, there is shown such a compact, high-efficiency, multiple pair, centrifugal gas/oil separator apparatus, generally designated 10, for separating wellhead fluids 12 obtained from hydrocarbon production systems into separate oil and gas phases. As used herein, the term wellhead fluid means any two-phase mixture of oil and gas substantially in its natural state as extracted from the earth, or as transported from its extraction point to the gas/oil separator of the present invention. Typically it includes crude oil, produced water, and hydrocarbon gas from the hydrocarbon production system.

The gas/oil separator 10 comprises a drum or pressure vessel 14 having a wellhead fluid inlet 16 for providing the wellhead fluids 12 (typically crude oil and entrained gases) into the pressure vessel 14. A gas export outlet 18 is located at an end opposite the fluid inlet 16 of pressure vessel 14 for conveying separated gases 20 from the pressure vessel 14. Pressure vessel 14 includes an oil/ liquid export outlet 22 for conveying separated oil/liquids 24 from the pressure vessel 14. As shown in FIG. 1, pressure vessel 14 is oriented substantially vertically, with the wellhead fluid inlet 16 located generally at a lower end thereof, the gas export outlet 18 located at an upper end thereof, and the liquid export outlet 22 located at some intermediate location.

It will be understood by those skilled in the art that the term "pressure vessel 14" is used in the present disclosure and claims in its broadest sense as a shorthand term for a vessel which contains something under pressure, and not in any limiting sense as a term of art to imply that the apparatus encompasses only apparatus defined as a pressure vessel under certain engineering design codes, such as the A.S.M.E. Boiler and Pressure Vessel Code, applicable to pressure vessels. Depending upon the circumstances, in certain cases the design codes applicable to such pressure vessels might be applicable, but in other cases the design codes applicable to the design of pipes or other structures might be applicable. Thus, it will be understood that while the practical implementation of the compact gas/oil separator apparatus might involve different engineering design codes for pressure vessels, pipes, or some other classification or categorization, etc. depending on the application, the innovative structure and function of the apparatus remains the same.

The oil/gas separator 10 employs multiple pairs of centrifugal force separators; in particular, one or more curved-arm, centrifugal force, primary separator(s) 30 and one or more cyclone, centrifugal force, secondary separator(s) 50. These primary and secondary separators 30, 50 are similar to those described in U.S. Pat. Nos. 4,648,890 and 3,324, 634, and the text of same is hereby incorporated by reference as though fully set forth herein and the reader is referred to same as needed for specific details. The primary and secondary separators 30, 50 are always employed in pairs, and the combination of a centrifugal-type primary and secondary separator provides a compact and highly-efficient separator arrangement. The wellhead fluids 12 are first acted upon by the curved-arm, centrifugal force, primary separator(s) 30 which perform a first centrifugal force separation of oil/ liquids 26 from the two-phase wellhead fluids 12, producing a wet gas 28 with some remaining oil/liquid 29 therein. Then, the cyclone, centrifugal force, secondary separator(s) 50, located above and paired together with the curved-arm, centrifugal force, primary separator(s) 30, perform a second centrifugal force separation operation on the wet gas 28 leaving the primary separator(s) 30, from which a majority of the liquid has been removed, to remove as much of the remaining oil/liquid 29 from the wet gas 28 as possible.

Over 95 percent of the liquid in the wellhead fluids mixture 12 is separated therefrom by the primary separator (s) 30, and practically all of the remaining liquid in the wet gas 28 exiting the primary separator(s) 30 is removed by the secondary separators 50. Both the oil/liquid 26 removed by the primary separator 30 and the oil/liquid 29 removed by the secondary separator 50 are returned by gravity into a lower portion of the pressure vessel 14 forming a liquid inventory 31 therein. The high separation capacity of the primary and secondary separators 30, 50 allows for use of a single pair of primary and secondary separators if necessary, as shown in the embodiment of FIG. 3.

Figure 3:
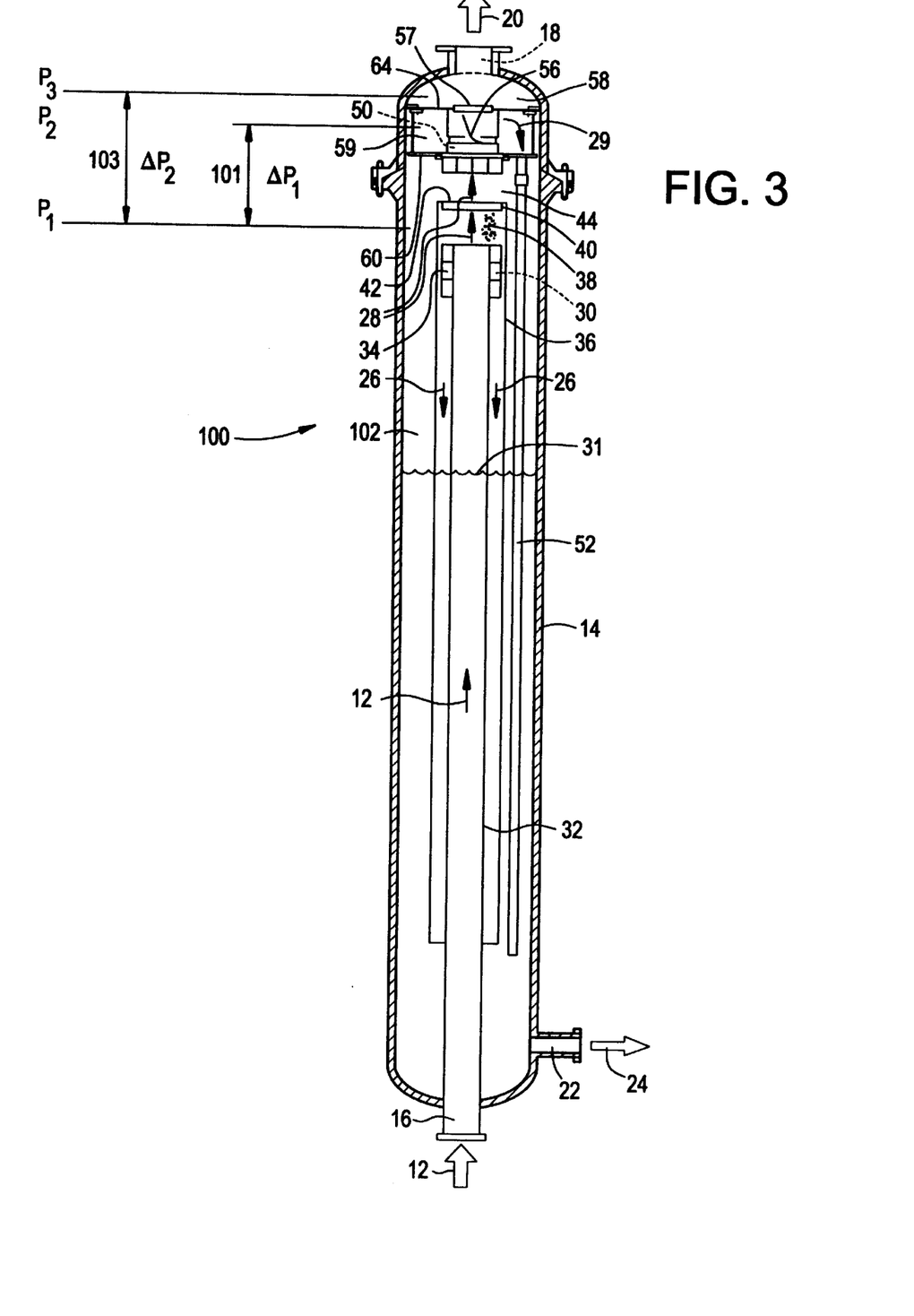
FIG. 3 is a schematic sectional view illustrating a compact gas/oil separator apparatus utilizing a single primary and a single secondary centrifugal separators.
Figure 4:
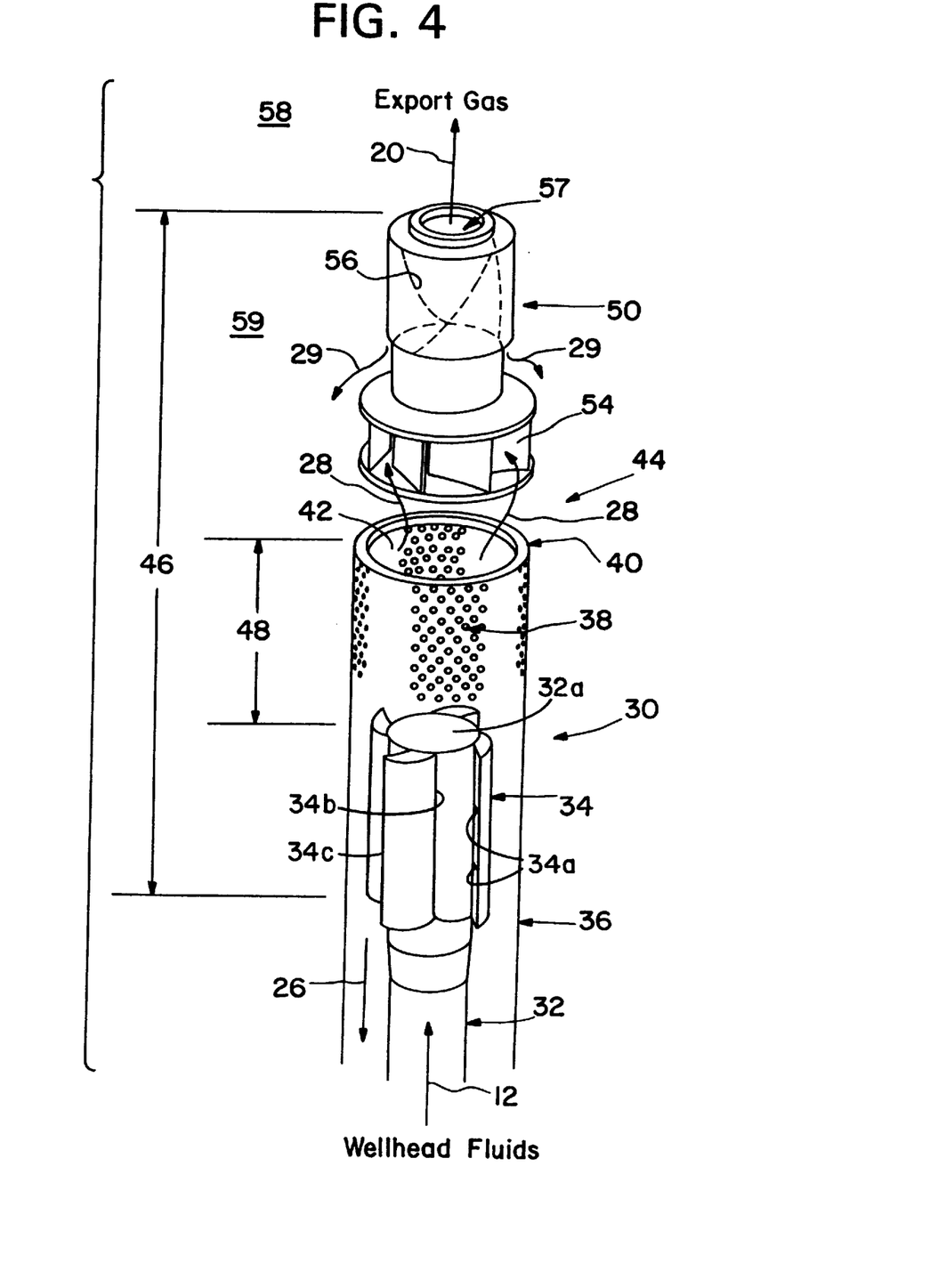
FIG. 4 is a close-up, perspective view of a paired curved-arm, primary separator and a cyclone, secondary separator used in the compact gas/oil separator apparatus.
Figure 5:
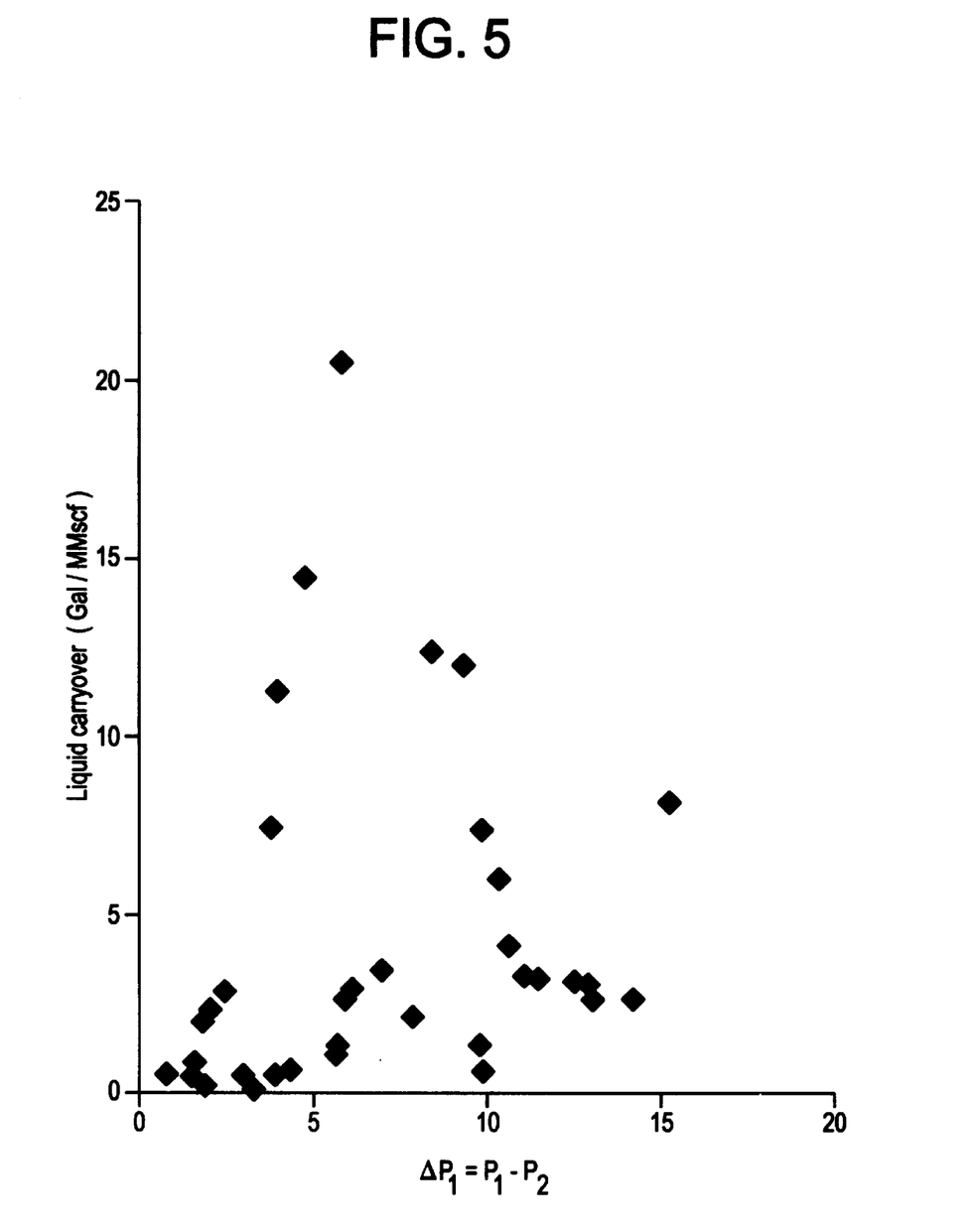
FIG. 5 is a graph of a pressure drop $\Delta P_1$ across the inlet region of the secondary cyclone separator versus liquid carryover.

As illustrated in FIGS. 1, 3 and 4, each curved-arm, centrifugal force, primary separator 30 comprises a riser tube 32 for conveying the wellhead fluids mixture 12 upwardly therethrough, four sets of multilayered curved-arms 34, and an outer can or return cylinder 36 surrounding riser tube 32 and curved-arms 34. The curved-arms 34 of the primary separator(s) 30 need not be of the re-entrant type disclosed in the aforementioned U.S. Pat. No. 4,648,890; curved-arms 34 may also be just attached to the outside wall of riser tube 32. Each multi-layered curved-arm 34 is formed of an axially extending curved wall which has an axially extending inner root edge 34b at the riser tube 32, and an axially extending outer edge 34c, the wall curving outwardly away from the riser tube. The riser tube has a closed upper end 32a. Radial partitions 34a divide the interior of the curved-arms 34 into their multiple layers. The wellhead fluids mixture 12 enters at the bottom of the riser tube 32 and flows upwardly therethrough until reaching the vicinity of the curved-arms 34, where it exits the riser tube 32. The majority of the oil/liquid separation from the wellhead fluids mixture 12 occurs as the mixture 12 flows through the curved-arms 34, the denser oil/liquids 26 in the mixture 12 tending towards the outer walls of the curved-arms 34. During the centrifugal separation process, a film of oil/liquid 26 develops on the inner wall of the return cylinder 36 and cascades down to the main liquid inventory 31 (FIG. 1). The return cylinder 36 extends above the top of the curved-arms 34 where there are a number of perforations 38, preferably ½ inch in diameter, and a retaining lip 40 at open top 42 of separator 30 which are used to improve the liquid removal capabilities of the separator 30 at high gas and liquid flows, and especially where slug conditions can exist. Various perforation geometries may be employed. The wet gas 28 exits the open top 42 of the primary separator(s) 30 into a substantially open interstage region 44 which is used to more evenly distribute the wet gas 28 prior to its entering the secondary cyclone(s) 50. This interstage region 44 also permits liquid droplets to fall out by gravity when wet gas flow 28 is below the droplet entrainment threshold. To ensure that the export gas 20 is as dry as possible, a required spacing distance indicated at reference numeral 46 in FIG. 5 is maintained between the primary separators 30 and the secondary separators 50, preferably at approximately 4 feet.

A separation distance is also maintained between the top of the multi-layered curved-arms 34 and the open top 42 of the primary separator 30, indicated at reference numeral 48, and preferably ranges from approximately 15 to approximately 18 inches. Liquid removal capacity can be increased by extending this distance.

As the two-phase wellhead fluid mixture 12 flows out through the curved-arms 34, separation occurs as the heavier oil/liquid droplets 26 migrate to the outer radius of the curved-arms 34 and the less dense wet gas 28 migrates to the inner radius of the curved-arms 34. Separation in the curved-arms 34 allows for an oil/liquid film 26 to be cleanly discharged onto the inner diameter of the return cylinder 36. The retaining lip 40 and perforations 38 are important at high wellhead fluids mixture 12 flows because the retaining lip 40 restricts the growth of the oil/liquid film 26 upwardly while the perforations 38 remove the separated oil/liquid 26 from the inside of the return cylinder 36 allowing it to return by gravity along the outside of return cylinder 36 to become a part of oil/liquid inventory 31. After flowing through the primary separator 30, the majority of separated oil/liquid 26 spirals downward on the inner diameter of the return cylinder 36 and combines with the liquid inventory 31 in the pressure vessel 14. The wet gas 28 and any remaining entrained oil/liquid droplets 29 enter the secondary separator 50 where the oil/liquid 29 is centrifugally separated from the wet gas 28. The separated oil/liquid 29 is returned to form a part of the liquid inventory 31 via drain tube 52 and the liquid-free vapor or export gas 20 exits the pressure vessel 14 as shown in FIG. 1.

The primary separator 30 has several advantages. The first is that the majority of the separation processes occur at the curved-arms 34. This makes the process inherently capable of accommodating a wide range of flow and level conditions and minimizes the potential for gas entrainment and resultant swelling in the pressure vessel 14's liquid inventory 31. Another advantage is that the relatively large flow passages of the curved-arms 34 essentially eliminates the risk of pluggage since there are no narrow gaps which could attract deposits. The result is a low-pressure drop, high performance primary separator 30 that will have a long life of maintenance-free service.

The secondary separator 50 also operates on the principle of centrifugal separation. The wet gas 28 enters the secondary separator 50 through tangential inlet vanes 54 at the bottom of the secondary separator 50 which impart a centrifugal motion to the wet gas 28. Any liquid remaining in the wet gas 28 is then forced to the inner wall of the secondary separator 50 where it is separated by secondary skimmer slots 56, exits through secondary outlet 57, and spills into secondary compartment 58 (FIGS. 1, 3 and 4). Secondary separator(s) 50 would typically be inserted through and supported by plate 60, to which would also be connected drain tubes 52. Bypass holes 62 are placed in top plate 64 of a tertiary compartment 59 to allow gas bypassing through the secondary skimmer slots 56 to exit the tertiary compartment 59 and enhance the skimming action. The separated oil/liquid 29 then drains via drain tube 52 back into lower portion of pressure vessel 14 and becomes a part of the main pressure vessel 14's liquid inventory 31. The drain tube 52 isolates the returning separated oil/liquid 29 from the upflowing wet gas flow 28 and avoids the re-entrainment of separated oil/liquid 29 by the upflowing wet gas 28.

The centrifugal force cyclone, secondary separator 50 has an inherent advantage over scrubber or mesh type dryers. Both scrubber and mesh type dryers are limited in flow capacity by the droplet entrainment threshold, beyond which liquid droplets are entrained with the vapor and are carried therewith. The centrifugal force cyclone, secondary separator 50, on the other hand, can efficiently operate at vapor fluxes typically two to three times higher than the droplet entrainment threshold.

The compact, gas/oil separator apparatus employs centrifugal-type separators for both the primary and secondary stages of separation. Other separator arrangements typically rely on gravity or inertial separation, which is limited in flow capacity by the droplet entrainment threshold beyond which liquid droplets are entrained with the vapor which are carried downstream. In contrast, the secondary separator of the compact, gas/oil separator apparatus is a centrifugal-type separator which can efficiently operate at vapor fluxes significantly higher than the entrainment threshold, in a compact arrangement. The separation envelope needed for a single-module, centrifugal gas/oil separator arrangement is approximately 4 feet long by 2 feet in diameter. Additional drum or pressure vessel 14 volume may be required to satisfy other system parameters such as inventory demands and liquid level control requirements. The centrifugal forces generated in the primary separator 30 develop as the mixture turns 90° out of the riser tube 32 and flows out through the curved-arms 34. This feature allows the two-phase wellhead fluids mixture 12 to enter the pressure vessel 14 through a lower axial inlet to the riser tube 32.

Figure 6:
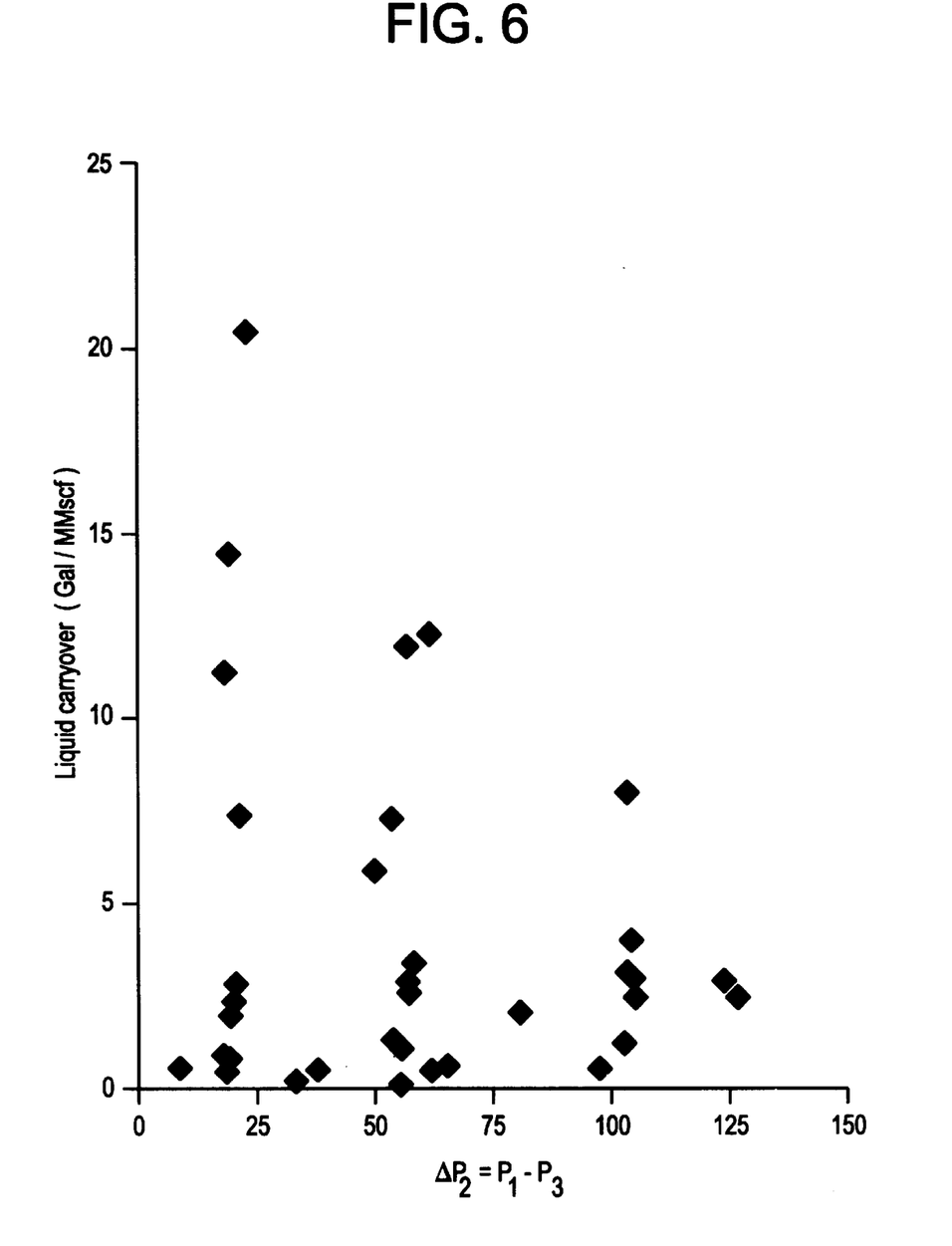
FIG. 6 is a graph of a pressure drop $\Delta P_2$ across the overall secondary cyclone separator versus liquid carryover.

As illustrated in FIG. 3, a currently preferred embodiment of the compact, gas/oil separator apparatus, generally designated 100, utilizes at least one pair of centrifugal force primary and secondary separators 30, 50 for separating a wellhead fluid 12 containing crude oil, produced water, and hydrocarbon gas 20 from a hydrocarbon production system (not shown) into its gas and liquid parts. Through testing with hydrocarbon fluids it has been learned that a relationship exists between the liquid carryover performance of the compact, gas/oil separator apparatus 100 and two pressure drop measurements made across the secondary cyclone centrifugal separator 50 during steady-state operation. Referring to FIG. 5, the first pressure drop measurement is that across only an inlet region 101 of the secondary separator 50; i.e., a first differential pressure measurement $\Delta P_1$ equal to the difference between a pressure $P_1$ existing in a main oil/liquid inventory compartment 102 minus a pressure $P_2$ existing in the tertiary compartment 59 defined inbetween the support plate 60 and the top plate 64. Referring to FIG. 6, the second pressure drop measurement is that across the overall 103 secondary cyclone centrifugal separator 50; i.e., a second differential pressure measurement $\Delta P_2$ equal to the difference between the pressure $P_1$ existing in the main oil/liquid inventory compartment 102 minus a pressure $P_3$ existing in the portion of the secondary compartment 58 above the top plate 64 and just upstream of the gas export outlet 18.

Figure 7:
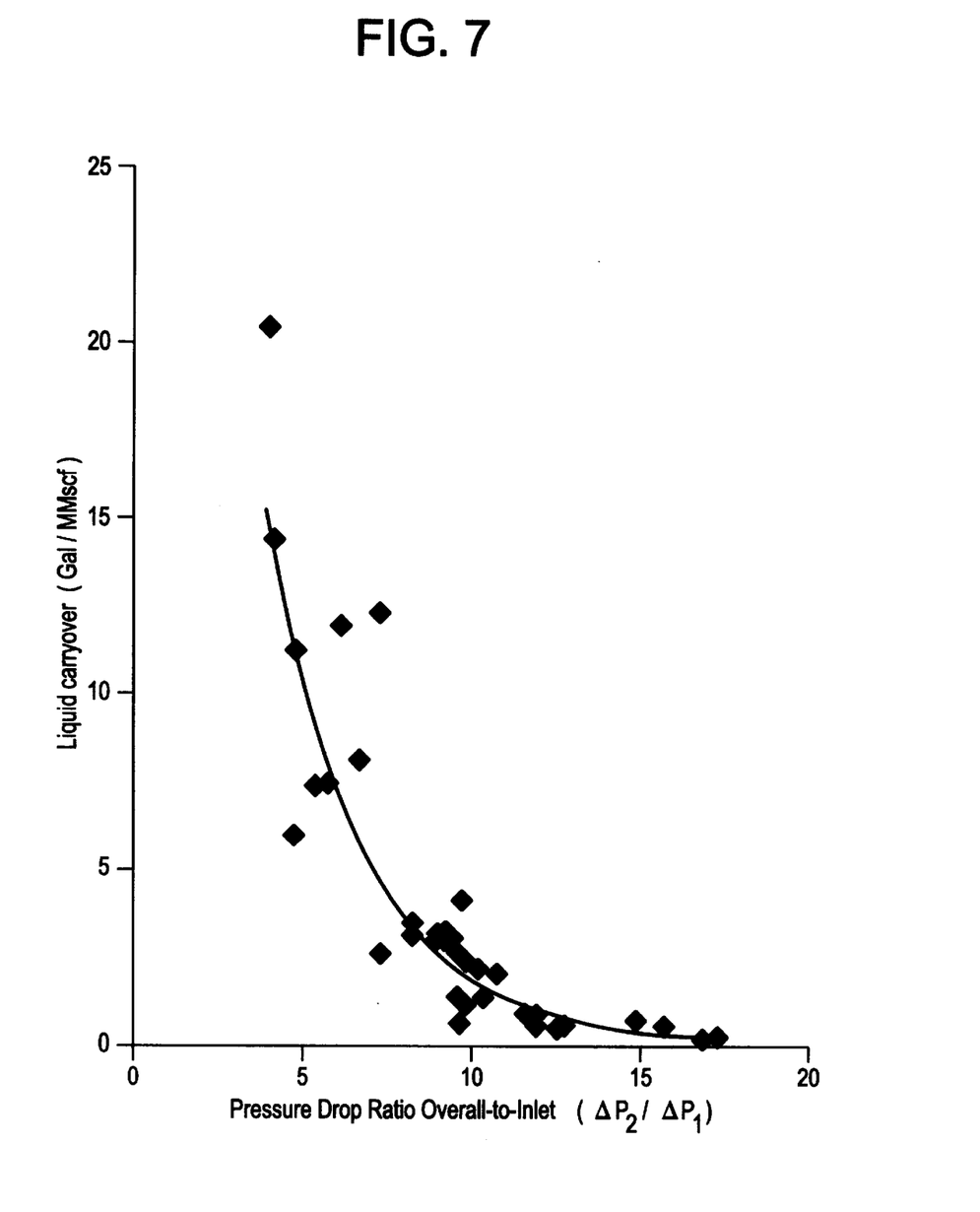
FIG. 7 is a graph of a ratio of the overall secondary cyclone pressure drop $\Delta P_2$ to the inlet region pressure drop $\Delta P_1$, i.e., $(\Delta P_2/\Delta P_1)$ versus liquid carryover.
Figure 8:
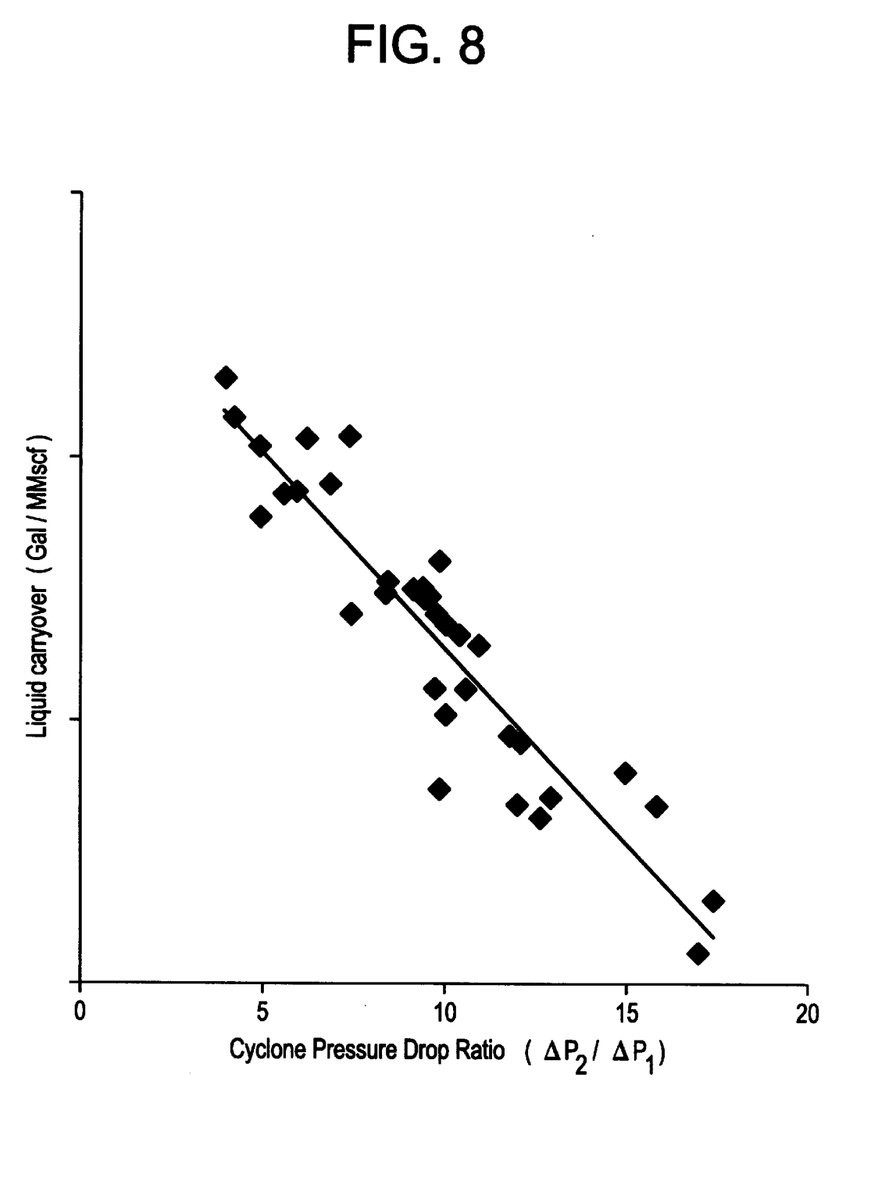
FIG. 8 is a graph of a ratio of the overall secondary cyclone pressure drop $\Delta P_2$ to the inlet region pressure drop $\Delta P_1$, i.e., $(\Delta P_2/\Delta P_1)$ versus liquid carryover, plotted on semi-log paper.

As illustrated in FIGS. 5 and 6, these individual pressure drops $\Delta P_1$ and $\Delta P_2$ do not provide any useful information on the liquid carryover performance of the compact, gas/oil separator apparatus 100. However, as illustrated in FIG. 7, when these measurements are combined as a ratio of the overall secondary cyclone pressure drop $\Delta P_2$ to the inlet region 101 pressure drop $\Delta P_1$, i.e., $(\Delta P_2/\Delta P_1)$, a very clear trend is established with the liquid carryover performance. As this pressure drop ratio becomes less than about 10, liquid carryover is seen to increase markedly, and such a steady-state trend can be used to monitor the liquid carryover performance of the compact, gas/oil separator apparatus 100. FIG. 8 illustrates the same data as that shown in FIG. 7, but plotted on semi-log paper. It will be noted that there is relatively little scatter in the data and that it agrees quite well with the line representing a mathematical curve fit of the data.

Figure 9:
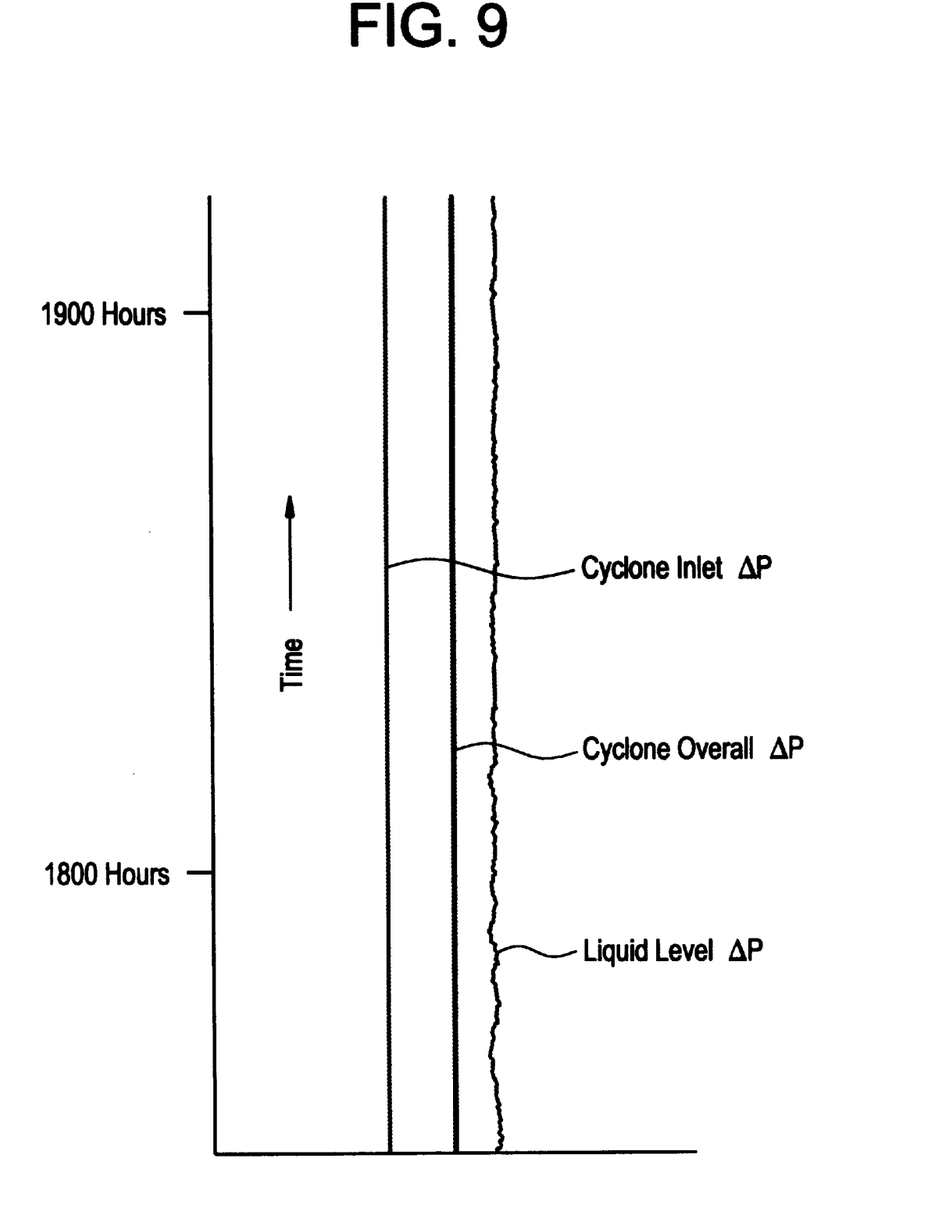
FIG. 9 is a strip chart trace which illustrates the typical response of the secondary cyclone separator inlet region pressure drop $\Delta P_1$ and the overall secondary cyclone separator pressure drop $\Delta P_2$ during a normal operating condition.

Another observation gained through testing with hydrocarbon fluids relates to the time response of these same differential pressure drop measurements $\Delta P_1$ and $\Delta P_2$ during an upset condition in the compact, gas/oil separator apparatus 100. FIG. 9 is a strip chart trace which illustrates the typical response of the secondary cyclone separator 50 inlet region 101 pressure drop $\Delta P_1$ and the overall 103 secondary cyclone separator 50 pressure drop $\Delta P_2$ during a normal operating condition where the compact, gas/oil separator apparatus 100 was producing an acceptable quality gas 20 in terms of liquid carryover. The compact, gas/oil separator apparatus 100 vessel's liquid level 31 $\Delta P$ signal (liquid level 31 is determined from a pressure head measurement) is also shown on the strip chart tracing. The secondary cyclone separator 50 pressure drop signals $\Delta P_1$ and $\Delta P_2$ are well behaved.

Figure 10:
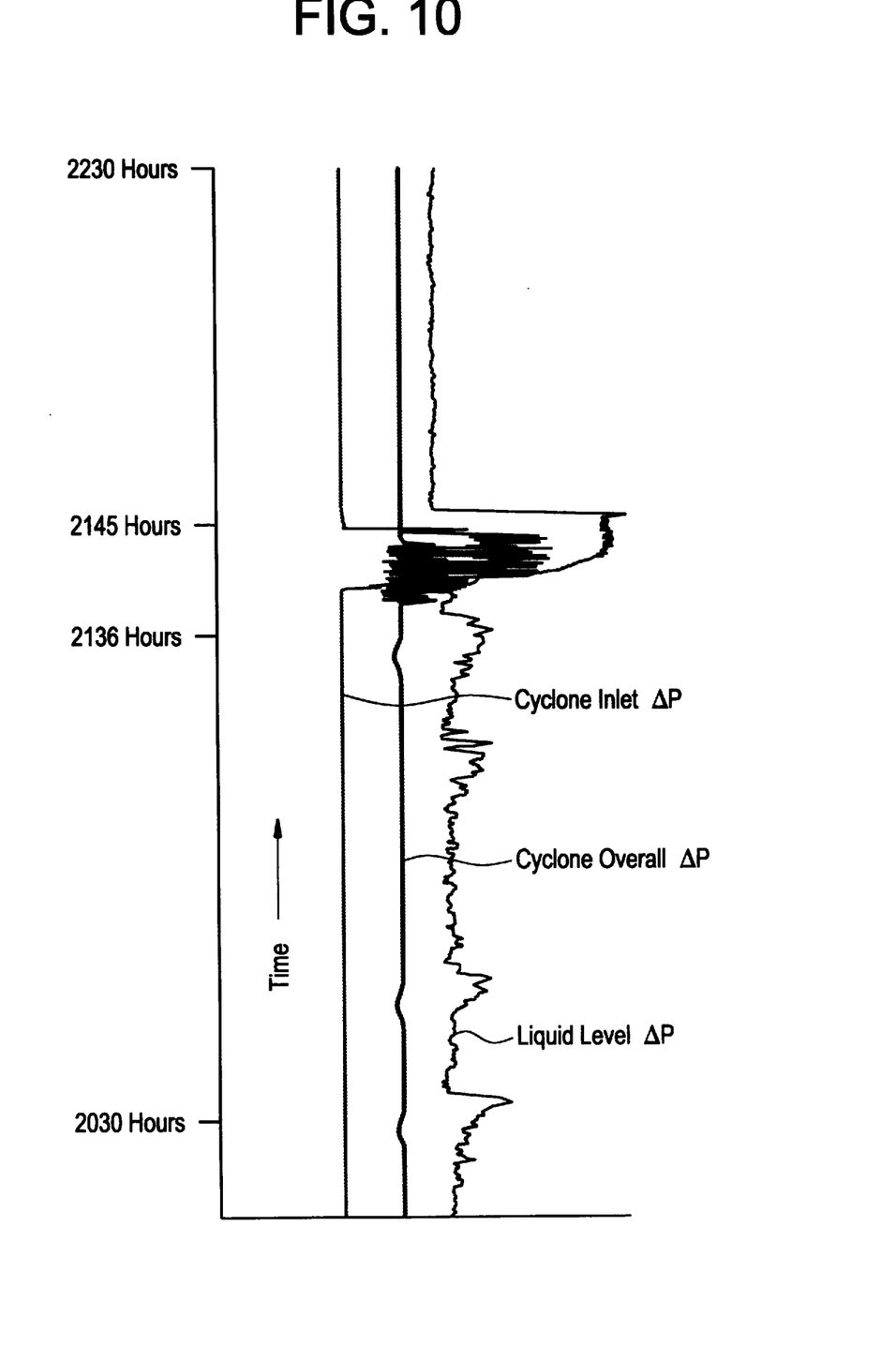
FIG. 10 is a strip chart trace which illustrates the typical response of the secondary cyclone separator inlet region pressure drop $\Delta P_1$ and the overall secondary cyclone separator pressure drop $\Delta P_2$ during a liquid carryover excursion operating condition.

However, FIG. 10 is a strip chart trace which illustrates the response of these pressure drop signals during an upset condition that caused a liquid carryover excursion. As shown, prior to 2030 hours, additional liquids were sporadically being pumped into the compact, gas/oil separator apparatus 100 causing the liquid level ΔP to vary with time. The secondary cyclone separator 50 pressure drop signals $\Delta P_1$ and $\Delta P_2$ indicated good performance until approximately 2136 hours. At that time, the liquid level 31 in the vessel 14 increased sharply to about 43%. Triggered by this high liquid level 31, the secondary cyclone separator 50 inlet region 101 pressure drop $\Delta P_1$ responded by increasing sharply from 21% to 35%, and the signal became very noisy (i.e., the rapid back and forth or fluctuating signal tracings). The signal representative of the secondary cyclone separator 50 overall 103 pressure drop, $\Delta P_2$, responded by increasing slightly but it also became very noisy.

The higher liquid level in the vessel 14 at 2136 hours caused an excursion in the compact, gas/oil separator apparatus' 100 liquid carryover performance as indicated by both pressure drop signals $\Delta P_1$ and $\Delta P_2$. When the additional liquids were no longer being pumped into the system (at approximately 2145 hours) the liquid level in the separator vessel 14 decreased to its previous setting and the two pressure drop signals $\Delta P_1$ and $\Delta P_2$ responded accordingly. The compact, gas/oil separator apparatus 100 was again operating with acceptable liquid carryover performance. This response of the two pressure drop signals $\Delta P_1$ and $\Delta P_2$ to liquid carryover excursions was consistently observed during this testing over two months and was well correlated with visual observations of liquid carryover with the gas.

The time response signals from the two pressure drop measurements are unique to the operating characteristics of the combination of a curved-arm, centrifugal force, primary separator 30 and a cyclone, centrifugal force, secondary separator 50 as used in the compact, gas/oil separator apparatus 100 described herein. These pressure drop signals $\Delta P_1$ and $\Delta P_2$ can thus be used to provide a real-time monitoring and control capability for the compact, gas/oil separator apparatus 100. Such features provide a higher level of assurance that the compact, gas/oil separator apparatus 100 is producing a gas output stream 20 of acceptable quality.

The steady-state signals illustrated in FIGS. 7 and 8, resulting from the ratio of overall-to-inlet pressure drops associated with the cyclone, centrifugal force, secondary separator 50 can be used to monitor the performance of the compact, gas/oil separator apparatus 100 over time and alert a human operator to a condition that may require some attention. For example, for a given hydrocarbon production system, one would establish a normal operating characteristic where the pressure drop ratio ($\Delta P_2/\Delta P_1$) would typically be approximately 10 or greater. That is, the overall 103 cyclone separator 50 pressure drop would typically be approximately 10 times greater than the inlet region 101 pressure drop. Of course, the actual values of the secondary cyclone separator 50 pressure drop ratio at which any real actions may need to be taken would need to be developed based upon the specific application. Once the system characteristics of a given hydrocarbon production system have been determined and an appropriate secondary cyclone separator 50 pressure drop ratio selected, deviations therefrom could be used to determine if actions were needed. For example, if the pressure drop ratio ($\Delta P_2/\Delta P_1$) was found to decrease over time from its normal characteristic value, a human operator could be prompted to investigate other available means for evaluating the compact, gas/oil separator apparatus 100 performance. Various system parameters such as liquid level, chemical defoamer injection rate, or volume throughput could be adjusted if the results of the investigation warranted such changes. On the other hand, knowledge that the system is performing well may allow the operator to increase the flow through the compact gas/oil separator apparatus 100 by connecting additional flow streams to it or by increasing the production flow from the current well(s).

The time response signals illustrated in FIGS. 9 and 10 can be used as an immediate alert to the operator that the quality of the gas 20 has deteriorated and may be unacceptable. Depending upon the criticality of the gas quality in terms of liquid carryover, these time response signals could be routed into a control system to produce control signals that would take immediate action(s).

Figure 11:
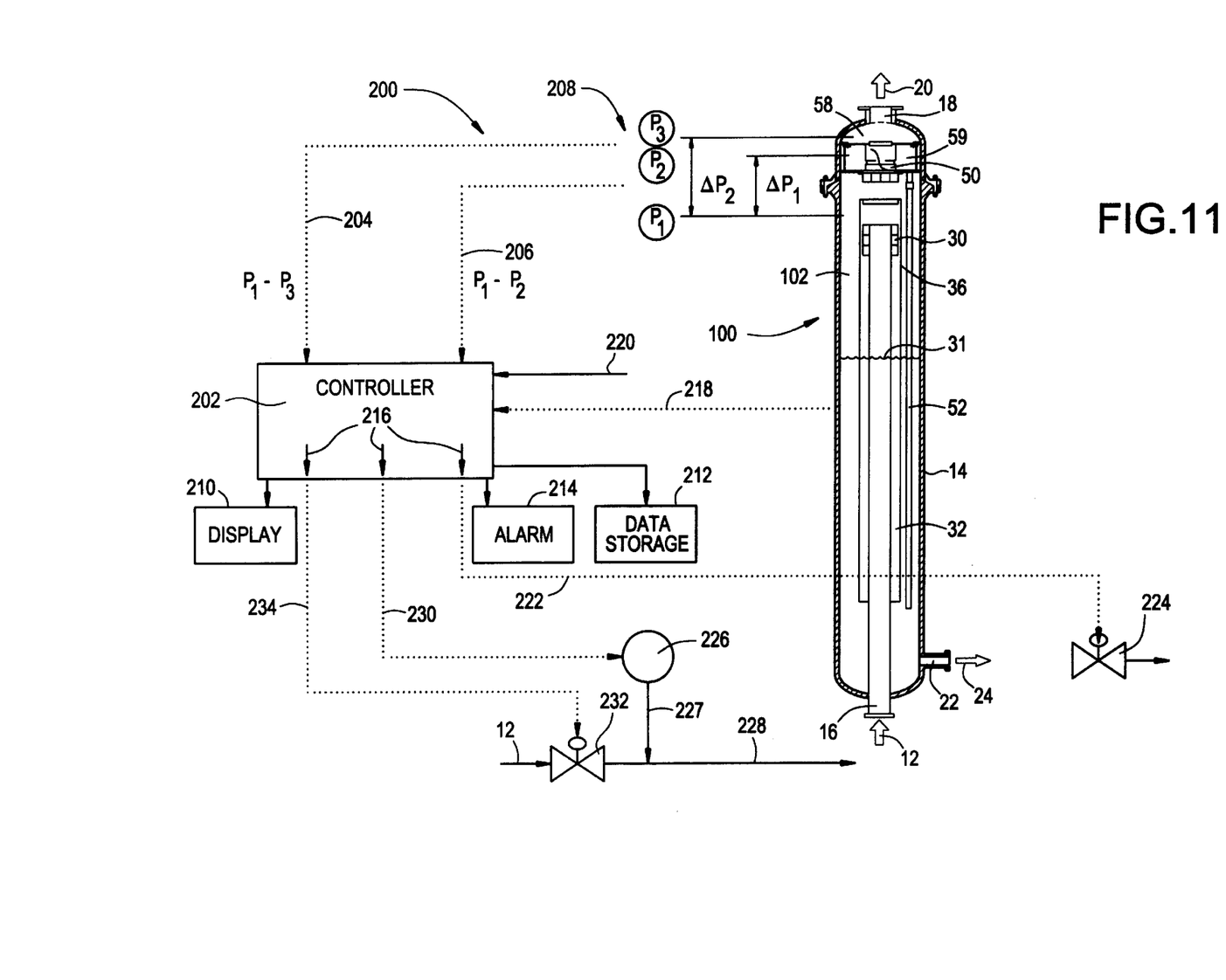
FIG. 11 is a schematic of a gas/oil separation system for monitoring and/or controlling the performance of a compact, gas/oil separator apparatus according to the present invention.

A gas/oil separation system for monitoring and/or controlling the performance of a compact, gas/oil separator apparatus 100 which utilizes at least one pair of centrifugal force primary and secondary separators 30, 50 for separating a wellhead fluid 12 containing crude oil, produced water, and hydrocarbon gas from a hydrocarbon production system into its gas 20 and liquid parts by producing real-time signals representative of the compact, gas/oil separator apparatus' liquid carryover performance, generally designated 200, is schematically illustrated in FIG. 11. Controller means 202, advantageously microprocessor-based, such as a Programmable Logic Controller (PLC), would be provided to receive input signals via lines 204, 206 from the compact, gas/oil separator apparatus 100 representative of both the secondary cyclone separator 50 inlet region 101 pressure drop $\Delta P_1$, and the overall 103 secondary cyclone separator 50 pressure drop $\Delta P_2$ via differential pressure transducers 208 of known construction. The controller means 202 would provide both pressure drop readings $\Delta P_1$ and $\Delta P_2$ to display means 210 for viewing by an operator. If desired they could also sent to data recording or storage means 212 and/or compared to user-preset setpoint values to activate an alarm means 214 for producing an auditory, visual, or combination alarm if they exceeded the setpoint values. More importantly, the controller means 202 would be designed so as to process these signals $\Delta P_1$ and $\Delta P_2$ and produce control signals 216 to accomplish desired control actions based upon the time response of these $\Delta P_1$ and $\Delta P_2$ signals. A liquid level signal could also be provided to the controller means 202 via a line 218. Means 220 would be provided for inputting the set point values for the various parameters controlled by the controller means 202, such as: liquid level 31 in the compact, gas/oil separator apparatus 100, an injection rate of defoamer chemical, and wellhead fluid 12 flow to the compact, gas/oil separator apparatus 100 (if that flow is controllable). In certain installations, the wellhead fluids 12 flow may not be adjustable other than either open or closed. Typically, the control signal outputs of the controller means 202 would be one or more control signals 216 which would be provided to control these various parameters via known types of devices associated with the hydrocarbon production system. These would include providing one control signal via line 222 for controlling a liquid level control valve 224 located on the oil/liquid export outlet 24; providing another control signal via line 230 for controlling a speed controller on a chemical defoamer injection pump 226 providing defoamer via line 227 into a wellhead fluid 12 inlet line 228; and/or controlling a wellhead fluid 12 choke valve 232 (if controllable as described above) via line 234.

Based upon the time response of these signals $\Delta P_1$ and $\Delta P_2$, the controller means 202 would act as follows. The controller means 202 would monitor the $\Delta P_1$ and $\Delta P_2$ signals over time to determine their normal values and to be able to use them for comparison with new data as it is acquired. Based upon the results of the testing described above, if the magnitude of the differential pressure signal $\Delta P_1$ suddenly increases, and its signal to noise ratio (SNR) decreases by a significant amount, and the SNR of the differential pressure signal $\Delta P_2$ decreases by a significant amount, this is a strong indication that liquid carryover from the gas/oil separator apparatus has increased to what may be an acceptable level. The following control actions would then be triggered in a sequential manner to resolve this likely faulted condition:

1. decrease the liquid level setpoint to a minimum liquid level set point
2. increase the injection rate of defoamer chemical
3. chokeback on wellhead flow to the gas/oil separator apparatus (if controllable)
4. shut off wellhead flow to the gas/oil separator apparatus (if controllable).

It will be appreciated that, depending upon the criticality of liquid carryover to the particular operation, the order in which these control actions are performed may be varied. Similarly, the controller means 202 could be programmed to take more than one control action at the same time; however, this could unduly complicate the controller means 202 and associated equipment specifications and increase the time needed to resolve the faulted condition.

The controller means 202 could be programmed to provide some amount of time after each control action and before any additional control action is taken, to allow the faulted condition to become resolved. The overall system would be considered back to normal condition when the SNR of the $\Delta P_1$ and $\Delta P_2$ signals returned to their normal values. With respect to the particular values of the SNR that would be desirable, it is recognized that the system characteristics of a given installation would be the final basis for selection of an appropriate SNR. Based upon the testing described above, it would appear that a large SNR, such as a SNR greater than approximately 25 may indicate acceptable carryover performance, while a relatively small SNR, such as a SNR less than approximately 5 may indicate unacceptable carryover performance.

While specific embodiments of the invention have been shown and described in detail to illustrate the application of the principles of the invention, it will be understood that the invention may be embodied otherwise without departing from such principles.

I claim:

1. A gas/oil separation system for monitoring and controlling the performance of a compact, gas/oil separator apparatus which utilizes at least one pair of centrifugal force primary and secondary separators for separating a wellhead fluid containing crude oil, produced water, and hydrocarbon gas from a hydrocarbon production system into its gas and liquid parts by producing real-time signals representative of the compact, gas/oil separator apparatus' liquid carryover performance, comprising:

a vessel having a wellhead fluid inlet for entry of a wellhead fluid, a gas export outlet for exit of export gas separated from the wellhead fluid, and an oil/liquid export outlet for exit of oil/liquid separated from the wellhead fluid;

a primary centrifugal separator in the vessel for separating a majority of the oil/liquid phase from the wellhead fluid to leave a wet gas phase;

a secondary centrifugal separator having an inlet region with a plurality of tangential inlet vanes into which the wet gas phase passes, spaced above and axially aligned with the primary centrifugal separator by an open interstage region, for receiving the wet gas phase and further separating oil/liquid from the wet gas phase to leave a dry gas phase, the secondary centrifugal separator including skimmer means defining skimmer slots above the inlet vanes for receiving the dry gas phase and for channeling the further separated oil/liquid downwardly into the vessel, the skimmer means having an open upper end communicating with the gas export outlet for passing the dry gas phase to the gas export outlet;

means for producing a first differential pressure measurement $\Delta P_1$ across the inlet region of the secondary cyclone centrifugal separator;

means for producing a second differential pressure measurement $\Delta P_2$ across the overall secondary cyclone centrifugal separator; and means for processing the first and second differential pressure measurements $\Delta P_1$ and $\Delta P_2$ and producing signals indicative of $\Delta P_1$ and $\Delta P_2$ for viewing by an operator.

2. The gas/oil separation system for monitoring and controlling the performance of a compact, gas/oil separator apparatus according to claim 1, wherein the means for processing the first and second differential pressure measurements $\Delta P_1$ and $\Delta P_2$ comprises means for processing the $\Delta P_1$ and $\Delta P_2$ differential pressure measurements to produce a signal representative of a ratio of the overall secondary cyclone pressure drop $\Delta P_2$ to the inlet region pressure drop $\Delta P_1$ equal to ($\Delta P_2/\Delta P_1$) for viewing by an operator.

3. The gas/oil separation system for monitoring and controlling the performance of a compact, gas/oil separator apparatus according to claim 1, wherein the means for processing the first and second differential pressure measurements $\Delta P_1$ and $\Delta P_2$ comprises controller means.

4. The gas/oil separation system for monitoring and controlling the performance of a compact, gas/oil separator apparatus according to claim 3, further comprising at least one of a liquid level control valve, a chemical defoamer injection pump, and a wellhead fluid choke valve, and wherein the controller means comprises means for producing control signals for controlling same based upon the first and second differential pressure measurements $\Delta P_1$ and $\Delta P_2$.

5. The gas/oil separation system for monitoring and controlling the performance of a compact, gas/oil separator apparatus according to claim 4, wherein the controller means comprises means for inputting user-defined setpoints for at least one of liquid level, chemical defoamer injection rate, and wellhead fluid flow rate.

6. The gas/oil separation system for monitoring and controlling the performance of a compact, gas/oil separator apparatus according to claim 4, wherein the controller means calculates magnitudes and signal to noise ratio (SNR) values of new first and second differential pressure measurements $\Delta P_1$ and $\Delta P_2$, compares same with calculated magnitudes and SNR values of previously collected first and second differential pressure measurements $\Delta P_1$ and $\Delta P_2$, and produces control signals for at least one of the liquid level control valve, the chemical defoamer injection pump, and the wellhead fluid choke valve based upon the comparison and changes in said magnitude and SNR values.

7. The gas/oil separation system for monitoring and controlling the performance of a compact, gas/oil separator apparatus according to claim 6, wherein the controller means produces and sends control signals to at least one of the liquid level control valve, the chemical defoamer injection pump, and the wellhead fluid choke valve to modify operating parameters of the system if a magnitude of the differential pressure signal $\Delta P_1$ suddenly increases, and its signal to noise ratio (SNR) decreases by a significant amount, and the SNR of the differential pressure signal $\Delta P_2$ decreases by a significant amount.

8. The gas/oil separation system for monitoring and controlling the performance of a compact, gas/oil separator apparatus according to claim 7, wherein the controller means produces and sends control signals to accomplish control actions comprising at least one of decrease the liquid level setpoint to a minimum liquid level set point, increase the injection rate of defoamer chemical, chokeback on wellhead flow to the gas/oil separator apparatus, and shut off wellhead flow to the gas/oil separator apparatus.

* * * * *